Feb. 26, 1929.　　　　　　　　　　　　　　1,703,310
E. LASHER
BACK FOR AUTOMOBILE SEATS
Filed April 11, 1924
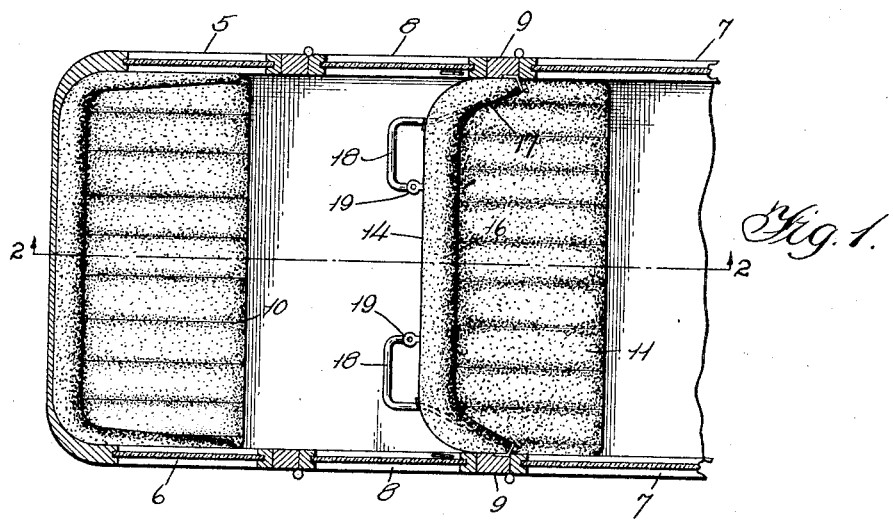
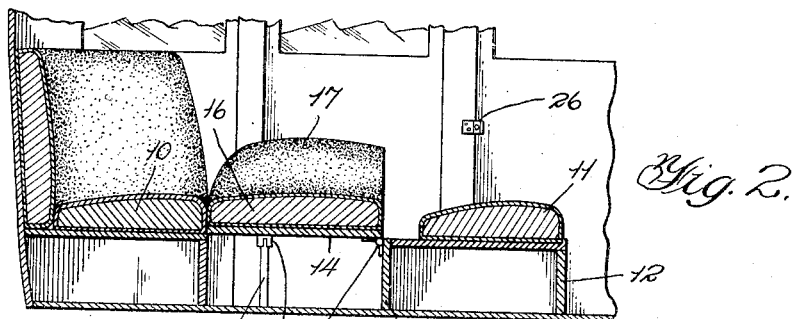
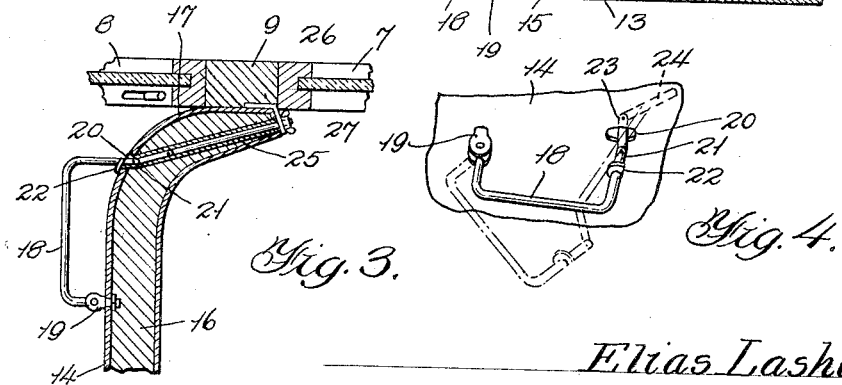
Elias Lasher
INVENTOR.
BY
Gordon & Stewart
ATTORNEYS Patented Feb. 26, 1929.

1,703,310

UNITED STATES PATENT OFFICE.

ELIAS LASHER, OF CATSKILL, NEW YORK.

BACK FOR AUTOMOBILE SEATS.

Application filed April 11, 1924. Serial No. 705,907.

Where automobiles are used for touring or long journeys, it is frequently found desirable to adapt the vehicle to sleeping purposes. This can be done by converting the seats into sleeping accommodations and numerous types of equipment have been devised for this purpose. In United States Letters Patent Number 1,457,843, I have shown one mode of accomplishing this result.

My present invention relates to the provision of such convertible seating equipment and more particularly to the transformation of the back of the front seat into a bed portion without material alteration of the conventional and usual vehicle parts. It is an object of my invention to utilize the present form of seat back without changing its shape, without dividing it into sections and without altering its structural relations with the other parts of the vehicle.

Further, I contemplate making the back of the seat adjustable, optionally into vertical or horizontal planes, but retaining a rigid type of construction, holding the parts in the desired positions during touring.

In carrying out my invention, it is possible to attain the above objects in an unobtrusive manner by adequately housing or hiding the operative mechanism within the usual seat back. This avoids exposed parts which are likely to cause trouble or annoyance to the occupants of the automobile.

It will be apparent that the structural details made use of have the additional advantage of reinforcing the frame of the vehicle and contributing materially to rigidity of the automobile body, being in the nature of a cross-brace between the side members of the body.

One form, in which my invention may be embodied is shown, by way of example, in the accompanying drawings, in which:

Figure 1 is a plan view of a vehicle including my improved seat back;

Fig. 2 is a vertical longitudinal section on the line 2—2 in Fig. 1;

Fig. 3 is a detail horizontal section; and

Fig. 4 is a fragmentary perspective view, showing the operation of the hand-grip.

As illustrated, an automobile body is shown, having sides 5 and 6 forming part of a closed vehicle. In each side there are a front door 7 and a rear door 8 between which the frame includes a side-post 9. This side-post extends from floor to roof and forms the door jamb. It is usually positioned opposite the end of the front seat and in advance of the rear wall of the latter.

The rear seat of the vehicle is shown at 10 while the front seat is designated at 11. The front seat includes a front base 12 and a rear base 13, both parts of the vehicle body.

A seat back 14 for the front seat is shown to be a continuation of the rear base 13, to which latter it is attached by hinges 15. These hinges permit the seat back to be moved into horizontal plane between the front and rear seats and by means of the attached cushion 16 to form a continuous couch with the seats.

The seat back is curved at the ends forming wings or side-portions 17 which usually form permanent attachments to the vehicle body through the side-posts 9. In the present case the ends move with the seat back, being separable from the side-posts. In the lowered position they extend slightly upward gradually merging into the planes of the rear doors and thus afford improved protection at the sides as indicated in Fig. 2.

The seat back, in its lowered position, is supported on the floor by the extended handgrips 18 in the well-known manner. These hand-grips are pivoted at their inner ends to fastenings 19 on the rear wall of the seat back 14. The hand-grips are of substantially U-shape, one arm of which is coincident with the rear wall and the other with the floor, thus forming a rigid brace.

The free end 21 of the hand-grip extends beyond an intermediate stopper, enlargement, cross-pin or the like, 22, which is adapted to abut against the rear wall. This stopper does not extend on the outer side of the hand-grip bar, leaving the side of the latter to contact throughout its length with the floor. The rear wall is apertured as at 20. Within the apertures 20 and running through the side portions or wings are flexible tubes 25 formed of rubber, coiled metal or the like which form guides to receive the end 21 but prevent it from harming the upholstery. The outlets from the tubes are opposite the side posts for reasons that will be set forth hereinafter.

The free ends 21 terminate in short joints 23, to which they are pivoted. The joints 23 are pivoted in turn to long extension rods 24 so proportioned that the combined length of members 21, 23 and 24 permit the lastnamed element to project beyond the outlets of the tubes in the side-portions 17. The rods 24 are given engaging properties by screw-threading, lateral detents or the like.

On each post 9 and opposite the outlets of the tubes 25 are fastened angle plates 26. The wings or side portions 17 will abut against these plates when the seat back is elevated. This will bring the outlets of tubes 25 in registry with holes in the outstanding portions of the angle plates as indicated at 26. Where the extension rods 24 terminate in lateral detents, these will engage the holes in the angle plates and form rigid connections or cross braces from side to side of the vehicle and through the seat back. Alternative means may be used for fastening members 24 to the angle plates 26, for example, wing nuts or the like may be used.

The space relations existing between the pivoted hand-grips and the tubing, as well as the general axial direction of the latter, make it essentially desirable to include the jointed section 23 to facilitate assembly. Operation of the device will be readily apparent, the hand-grips being extended to form supports when the seat back is lowered. In this position the joints 23 and extensions 24 extend along the floor of the vehicle or optionally folded back against the corresponding parts of the hand-grip 18.

When it is desired to restore the seat back to its elevated position, it is swung upwardly on hinges 15 until the wings or side portions abut against the outstanding parts of hinge plates 26. The extensions 24 are then threaded through tubes 25, being permitted to accommodate themselves to the general direction of the tubes by reason of the jointed connection through members 23 with the free ends of hand-grips. The engaging ends of extension rods 24 project beyond side portions 17 and plates 26. Fastening means are then applied, unless provision is made for the members 24 latching with plate 26.

By this means the customary and conventional type of vehicle may be used as a basis for carrying out the purpose of this invention and without material alteration of the vehicle structure. The fastening means is applied in an unobtrusive way, not readily evident to the casual observer in either of the positions of the seat back. At the same time added strength, in the nature of a crossbrace, is provided between side-posts 9 and through the seat back 14.

While I have shown and described one form of my invention, it will be readily apparent that many changes may be made in minor details without departing from the scope of my invention, as set forth in the appended claims.

What I claim is:

1. In combination with the body of a vehicle having front and rear cross seats, a seat back hinged at its base to said front seat to form a support in the plane of the seats and therebetween; passageways through the seat back from rear to front, hand-grips pivotally connected to the rear wall of the seat back and extensions on the opposite free ends of the hand-grips adapted to be removably projected through said passageways and fasten the seat back to the body of the vehicle.

2. In combination with the body of a vehicle having front and rear cross seats, a seat back hinged at its base to said front seat to form a support in the plane of the seats and therebetween; flexible tubular members having their ends in the front and rear walls of the seat back and forming passageways through the seat back, hand-grips pivotally connected to the rear wall of the seat back and extensions on the opposite free ends of the hand-grips adapted to be removably projected through said passageways and fasten the seat back to the body of the vehicle.

3. In combination with the body of a vehicle having front and rear cross seats, a seat back hinged at its base to said front seat to form a support in the plane of the seats and therebetween, passageways through the seat back from rear to front, hand-grips pivotally connected to the rear wall of the seat back, extensions on the opposite free ends of the hand-grips adapted to be removably projected through said passageways and means on the body of the vehicle to receive and anchor the said extensions.

4. In combination with the body of a vehicle having front and rear cross seats, a seat back hinged at its base to said front seat to form a support in the plane of the seats and therebetween, side portions for said seat back, passageways through said side portions from rear to front, hand-grips pivotally connected to the rear wall of the seat back and extensions on the free ends of the hand-grips adapted to project through sid passageways and fasten said seat back to the body of the vehicle.

5. In combination with the body of a vehicle having front and rear seats, a seat back hinged at its base to said front seat to form a support in the plane of the seats and therebetween, hand-grips pivotally connected to the rear wall of the seat back, a jointed extension on the free end of each hand-grip extending through the seat back from rear to front, and means to fasten the extensions to the side members of the vehicle body.

6. In combination with the body of a vehicle having front and rear seats, a seat back hinged at its base to said front seat to form a support in the plane of the seats and therebetween, hand-grips pivotally connected to the rear wall of the seat back, a jointed extension on the free end of each hand-grip extending through the seat back from rear to front and means on the side-posts of the vehicle body to receive the extensions in locking engagement.

7. In combination with the body of a vehicle having front and rear seats, a seat back hinged at its base to said front seat to form a support in the plane of the seats and therebetween, hand-grips pivotally connected to the rear wall of the seat back, a stopper intermediate the ends of each hand-grip engaging the rear wall, a jointed extension on the free end of each hand-grip and means to fasten the extensions through the seat back to the side members of the vehicle body adjacent to the front of the seat back.

8. In combination with the body of a vehicle having side members and a seat, a seat back fastened at its base to the rear of said seat, hand-grips mounted on the rear wall of the said back and having concealed extensions on their opposite free ends passing forwardly through the seat back from rear to front, and means for fastening said extensions to the side members of the vehicle body at a point adjacent the front surface of the seat back.

9. In combination with the body of a vehicle having side members and a seat, a seat back having divergent side wings, said seat back being fastened at its base to the rear of said seat, a pair of concealed supporting members extending forwardly and divergently through the side wings of said seat back from the rear to the front, said members being provided with means for fastening the same to the side members of the vehicle body at a point adjacent the front surface of the seat back and being provided with means at their rear ends for supporting the said seat back.

In testimony whereof, I have hereunto affixed my signature.

ELIAS LASHER.